March 16, 1954  R. A. FISCHER  2,672,085
PNEUMATIC VALVE

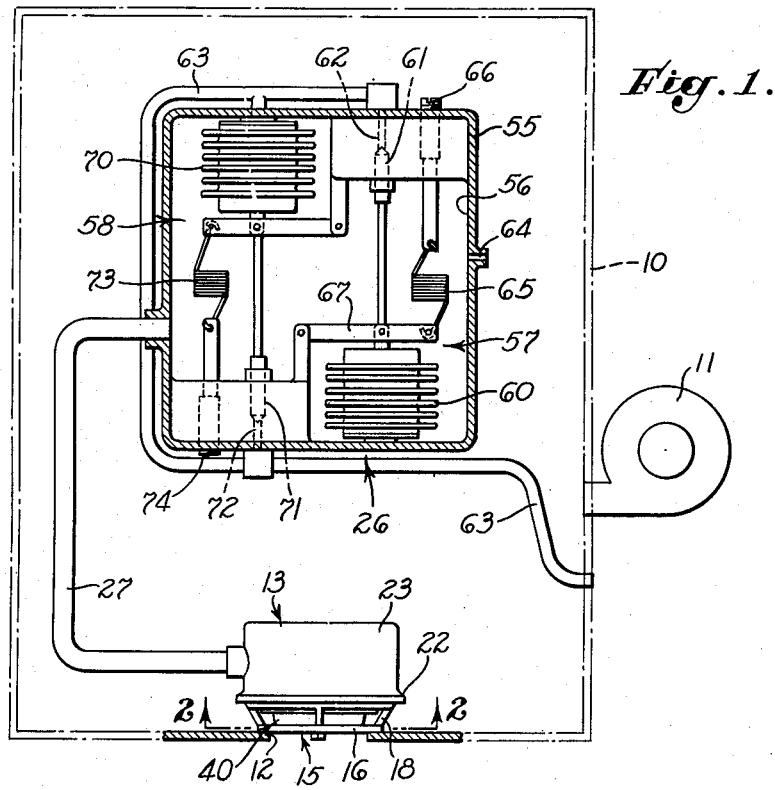

Filed June 18, 1948  3 Sheets-Sheet 2

INVENTOR.
RICHARD A. FISCHER
BY HIS ATTORNEYS.
HARRIS, KIECH, FOSTER & HARRIS
BY

Patented Mar. 16, 1954

2,672,085

UNITED STATES PATENT OFFICE 2,672,085

PNEUMATIC VALVE

Richard A. Fischer, Los Angeles, Calif., assignor to The Garrett Corporation, Los Angeles, Calif., a corporation of California Application June 18, 1948, Serial No. 33,845

27 Claims. (Cl. 98—1.5)

This invention relates generally to the valve art and particularly to pneumatic valves for controlling the flow of gases in various systems.

While the invention has particular utility in connection with pressurized ventilation of aircraft cabins and the like, and is hereinafter shown and described as embodied in such a conditioning system, it is to be understood that its utility is not limited thereto.

In the pressurization of aircraft cabins, air is supplied to the cabin under pressure from a supercharger which is operated continuously during a flight. As is well known to those versed in the art, the pressure of air within the cabin must be maintained at a predetermined value or within a range which provides comfort for the passengers and crew and safety for the aircraft cabin structure. Since atmospheric pressure decreases progressively as the airplane ascends, and increases as the aircraft descends, it is necessary to vary the pressure of the cabin air so as to effect a differential between the cabin air and that of the ambient atmosphere which will provide comfort for the passengers and crew. Thus, cabin pressure may be constant or may be changed at a gradual pre-selected schedule of increase or decrease so that the pressure within the cabin will have reached a value substantially that of the ambient atmospheric pressure at the destination of the flight.

The air pressure within the cabin or enclosure is controlled by a valve disposed in an opening in the wall of the enclosure and operative to release air therefrom to maintain the cabin pressure at the required pressure, the operation of the valve being responsive to differentials between the cabin air pressure and a control chamber pressure. Outflow valves of the diaphragm type are known to those versed in the art. Such valves include valve plates or poppets which are adapted to be seated and unseated by movement of a diaphragm, to which they are operatively connected, so as to retain the air within the enclosure or permit its escape therefrom in accordance with predetermined requirements. The diaphragm is flexed, to effect movement of the poppets, in response to differentials in pressure on its opposite sides, one side of the diaphragm being exposed to a predetermined fixed, or controlledly, varied air pressure while the other side thereof is subjected to cabin pressure. By this means, the pressure of the air within the enclosure is controlled so as to maintain a pre-selected fixed or controlledly varied cabin pressure.

In order to insure a most sensitive and positive control of the valve for all conditions, it has heretofore been deemed advisable to employ a valve having a pair of the valve plates or poppets operated by the diaphragm, the arrangement being such that the cabin pressure acts against the opposite sides of the two poppets and thus tends to simultaneously open one poppet and close the other poppet. By this provision, movement of the poppets is not substantially affected by the pressure differential across them and a substantial balance of forces acting on the poppets is created. It has been determined, however, that in valves of this double poppet type one poppet is usually movable in a zone of relatively high pressure while the other poppet is movable in an area of lower pressure. This condition tends to produce a difference in air flow patterns across the faces of the two poppets, these different patterns changing with the degree of valve opening and thus causing unbalancing of the valve system. In order to overcome this difficulty, specific valve contours are required for particular design requirements as regards differentials between enclosure and atmospheric pressures, rates of flow, etc. Moreover, since the two valve plates are connected, and thus move in unison, it has been found difficult to manufacture the valve with such precision that both plates or poppets will simultaneously and positively close tightly against their seats to prevent leakage of air through the valve.

In an effort to avoid the difficulties mentioned above, valves of a single valve plate or poppet type have been proposed for use in aircraft pressurizing systems, such valves being installed in the same manner as those employing double valve plates or poppets. While a valve of the single poppet type is more practical from the manufacturing and servicing standpoint, it has the disadvantage of becoming improperly balanced at some control position, that is, at some degree of valve opening. That is to say, while the single poppet will be balanced at some particular control position or may be stable between closed and some critical position, further increase of flow, as effected by additional opening of the valve may cause instability and flutter. Since the frontal area of the valve poppet is exposed to the direction of the air flow and this same area of the poppet is the sensing means for controlling the valve, conditions arise where the air flow pattern causes changing pressures on said frontal area of the poppet, thus upsetting or impairing the valve control. Again, in order to overcome the difficulty last referred to, a specific valve shape is imperative.

It is an object of this invention to provide a valve of the single poppet or valve member type for use in air pressurizing systems in which the movable valve member or poppet is free from the deficiencies discussed above and thus maintains a better balance under all conditions of operation. The valve is thus rendered more sensitive in operation and its use results in a more accurate regulation of the pressure within the cabin or other enclosure being pressurized.

Another object of the invention is to provide a valve, of the character referred to, in which the forces acting on the movable valve member are balanced against each other, one of these forces being that caused by the cabin pressure which is exerted against one side of the valve member and the other being an equal, opposite force caused by the control pressure plus the force of a spring exerted against the opposite side of the valve member. The other remaining forces on the valve member caused by the difference in pressures in the cabin and the ambient atmosphere are exerted equally and oppositely.

Another object is to provide a valve of the type indicated in which the poppet is supported by a diaphragm having a very small portion exposed to ambient atmospheric pressure, this portion being of sufficient area to provide a force on the movable valve, due to the action of atmospheric pressure, equal and opposite to the force which is due to atmospheric pressure action, agains the inner area of the movable valve. It is a related object to provide a diaphragm which is of sufficient depth to allow the required opening of the valve for desired quantities of air-flow.

Another object is to provide a valve, of the type referred to, in which the movable valve member or poppet is of a frusto-conical shape and provided with a peripheral flange, by which it is secured to the diaphragm, the poppet having a sharp annular end engageable with the valve seat to effectively regulate the flow of air from the cabin to the atmosphere.

Another object is to provide a valve, of the type referred to, which can be installed within the enclosure from which it is to control the efflux of air or other gaseous fluid.

Another object is to provide a valve of the type specified in which a minimum area of the diaphragm and valve member normal to the direction of flow is disposed in the immediate passage leading past the valve from the cabin to the atmosphere, that is, at or near the zone of greatest air velocity so that turbulence created by the discharging cabin air does not disturb the functioning of the valve.

It is also an object of my invention to provide pressure control means or mechanism for an enclosure or space having a pressure sensitive member operative to position a valve member so as to control flow through an opening of the enclosure, the valve member and a wall or barrier cooperating to provide a pocket adjacent the enclosure opening so shaped that forces applied by fluid pressure in said pocket will not move the valve toward open or closed position.

It is another object of my invention to provide such a pressure control mechanism in which the pressure sensitive means has three areas, one of which is exposed to a pressure in a chamber, the other of which is exposed to pressure in the enclosure, these areas being substantially balanced, and also having a third area exposed to external pressure and being so shaped that external pressure exerts substantially no effective force in a direction tending to open or close the valve member of the pressure sensitive means.

It is also an object of my invention to provide a single poppet valve arrangement of the character herein referred to in which the barrier or central wall is secured to the pressure responsive means by means of a flexible sealing member.

It is a still further object of my invention to provide a flow control mechanism for an enclosure having an opening to the exterior thereof in which the pressure sensitive means includes a flange projecting toward a valve seat surrounding the opening in the enclosure in combination with a wall means cooperating with the flange to form a pocket which is exposed to the exterior of the enclosure through the opening thereof. These elements are combined with a flexible sealing means connecting the wall means and the flange, the flexible sealing means and the flange having opposed surfaces exposed to the pressure in the pocket, the effective areas of the opposed surfaces tending to open and close the valve member being substantially equal to thereby substantially cancel any tendency for the pressure in said pocket to move the valve arrangement toward open or closed positions.

It is another object of my invention to provide a fluid valve in which there is a barrier means positioned between the pressure sensitive means and the valve seat, this barrier forming a chamber on the side of the pressure sensitive means opposite from the pressure chamber of the assembly, thus protecting the central portion of the pressure sensitive means from pressures which may pass inwardly through the opening in the valve seat.

Further objects of the invention will be apparent from the following description and from the drawings which are intended for the purpose of illustration only, and in which:

Fig. 1 is a diagrammatic view of a control system which embodies the present improved pneumatic valve;

Fig. 2 is an enlarged view of the outlet end of the valve shown in Fig. 1;

Referring to Fig. 1, there is shown a schematic or diagrammatic representation of a cabin pressure control system of which the present improved pneumatic valve constitutes a component. An enclosure or cabin is indicated generally at 10, which is supplied by air under pressure by a supercharger 11, or the like, which may be operated by any suitable source of power, not shown, for maintaining a flow of air into the cabin for purposes of ventilation. The cabin is provided with an outflow opening 12 which is controlled by the present valve, indicated generally at 13, which is capable of directly controlling the cabin pressure by allowing discharge of air from the cabin through the opening into the atmosphere.

Figure 3:
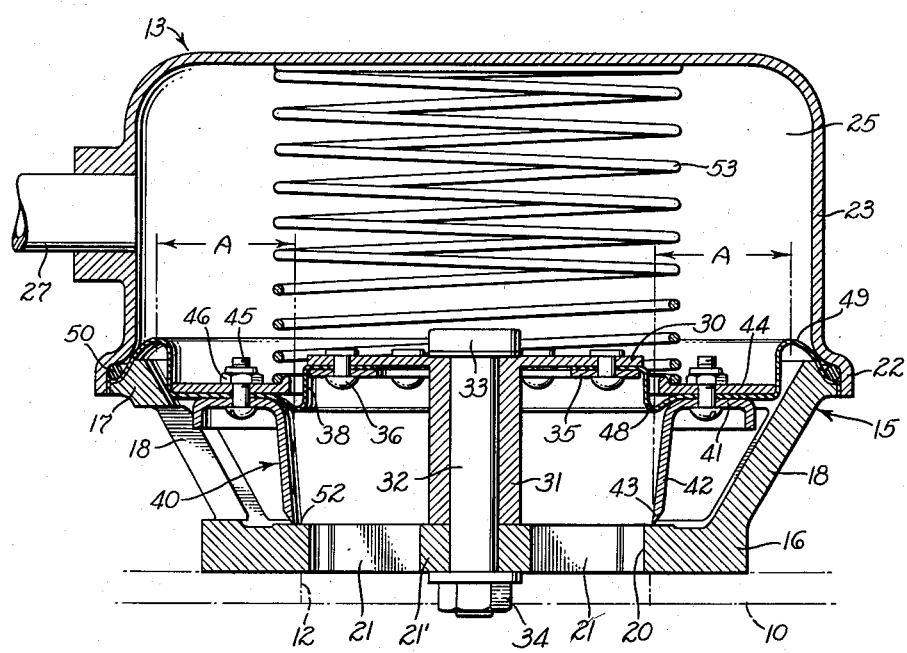
Fig. 3 is a further enlarged cross-sectional view of the valve taken on line 3—3 of Fig 2.

Referring to Figs. 1, 2, and 3, one embodiment of the valve 13 comprises a valve body 15 which is in the form of a spider having an annular end plate or ring 16 adapted to be suitably secured to an inner surface of the wall of the cabin or enclosure 10. The valve body 15 also has a co-axial annular flange 17 spaced inwardly from the end plate 16, the plate and flange being connected by webs or struts 18 between which cabin air can flow into the central portion of the valve body and exhaust through a central opening 20 provided between radial webs 21 extending between the end ring plate 16 and a central hub-like portion 21", when the valve is open.

Surrounding and secured to the periphery of the flange 17 of the body member 15 is the lower flared end 22 of a cupped casing 23 the walls of which define a control pressure chamber 25. The chamber 25 is connected in fluid communication to a regulator device, indicated at 26 in Fig. 1, by means of a line 27.

Arranged coaxially with the valve body 15 is a wall means comprising a disc-like holder or support member 30 having a hub 31 which seats against the central portion 21' of the end ring 16. A bolt 32 passing downwardly through the bore of the member 30 and through a hole in the end plate has a head 33 abutting the upper end of the member. A nut 34 screwed onto the lower projecting end of the bolt 32 secures the member fixedly in place. Secured to the under side of the holder member 30 by means of an annulus 35 and rivets 36 is the central portion of a diaphragm 38, to be later described in detail, which forms part of a movable valve assembly.

A movable valve member 40, also constituting a component of the valve assembly, is disposed within and arranged for axial movement with respect to the valve body 15. The valve member 40 includes an annular flange 41 and a coaxial frusto-conical extension 42, the lower end of which has its extremity cut at an angle to provide, in effect, a knife edge 43 adapted to seat against the upper surface of the end plate 16 when the valve member 40 is moved downwardly so as to cut off the outflow of air from the cabin 10.

The diaphragm, which may be made from synthetic rubber or other impervious flexible material, extends across the upper end of the valve member 40 and is secured thereto by means of an annular clamping element 44 which is disposed against the upper surface of the diaphragm. Screws 45, passing through aligned holes in the flange 41, the diaphragm 38 and the element 44, receive nuts 46 which, when tightened, firmly clamp the several parts together. In other cases, rivets or the like may be employed for this purpose. The diaphragm 38 has a downwardly and laterally extending inner, free, arcuate convolution 48 between the holder member 30 and the valve member 40. The peripheral portion of the diaphragm 38 is extended upwardly and laterally in an outer, free, arcuate convolution 49. The upper surface of the inner convolution 48 is exposed to control air pressure within the chamber 25 and ambient atmospheric pressure within the confines of the frusto-conical extension 42 of the valve member 40. The outer convolution 49 is exposed to the control air pressure on one side and on the other side to cabin air pressure. The peripheral portion of the diaphragm 38 may be secured by screws or otherwise clamped between the flange 17 of the valve body 15 and the flared end 22 of the casing 23. A sealing ring 50 is also clamped therebetween so as to prevent flow of air between the interior of the cabin and the chamber 25.

The sharpened end 43 of the valve member 40 is adapted to engage with the top surface of the end ring 16, this surface of the end plate being hereinafter referred to as the valve seat 52. This engagement is effected by a relatively weak spring 53 which is lightly compressed between the clamping element 44 and the upper end of the casing 23.

The valve member or flange 40, in combination with the wall or barrier 30, forms a pocket which is accessible to the exterior through the valve opening 21. The convolution 48 comprises a flexible means for connecting the movable assembly 40 and 44 to the central member or barrier 30. This movable assembly constitutes a pressure responsive means which is subjected to chamber pressure on one side and enclosure pressure on the other side as will be explained hereinafter.

The pressure of the air or fluid against the convolution 48 exerts a force transferred by the outer portion of the convolution 48 to the pressure responsive means tending to move the same in a direction to open the valve. The frusto-conical flange 42 being of small diameter at its end nearest the valve seat 43 provides an area or shoulder against which pressure of the air or fluid in the pocket bears to produce a force in a direction tending to close the valve. These opposed surfaces or areas which are exposed to the fluid in the pocket are such that the forces resulting from the fluid pressure in the pocket are substantially balanced so that the valve will not thereby be moved toward open or closed positions.

As explained above, pressure of the air in the chamber 25 is controlled by a regulator device 26 through a line or tube 27. Various types of regulator devices might be employed for this purpose and the present invention is therefore not limited to the use of the particular device shown. The regulator device 26, which is herein illustrated by way of example only, will be described briefly as relating to the function of the present improved valve structure 13. The regulating device 26 comprises a box or housing 55 defining a chamber 56 in which are disposed two separate pressure controlling systems, namely, an isobaric control system indicated at 57 and a differential control system designated by the reference character 58 in Fig. 1.

The isobaric control system 57 includes an evacuated bellows 60 which is connected to operate a needle valve 61 which, in turn, controls the flow of air from the chamber 56 through a passage 62 and into a tube 63 which vents to the atmosphere. The chamber 56 is in communication with the cabin interior through a restricted orifice 64. A spring 65, whose tension may be adjusted by means of a screw 66, is connected by means of a lever 67 to the stem of the needle valve 61 and tends to move the latter to closed position. In practice, the screw 66 may be operated by an isobaric changer, not shown, which functions to change the tension of the spring 65 during flight in accordance with a predetermined flight plan.

The differential control system 58 comprises a similar combination of components. A bellows 70 has its interior vented to the atmosphere through the tube 63 and operates a needle valve 71 which functions to control the flow of air from the chamber 56 to the atmosphere by way of a passage 72 and the tube 63. A spring 73, whose tension can be adjusted by a screw 74, tends to normally move the needle valve 71 to closed position.

Considering the isobaric operation of the valve 13 in cooperation with the regulator 26, within this range of operation, cabin pressure is maintained at a constant selected value by the forces acting on the diaphragm 38 which position the outflow valve member 40. For any one isobaric setting, air pressure within the control chamber 25 is maintained constant against the upper side of the diaphragm 38 by the action of the isobaric bellows 60 and associated needle valve 61. This pressure, plus the force of the backing spring 53, opposed by cabin pressure acting against the bottom side of the diaphragm, positions the valve 40 so as to control the egress of air from the cabin 10 through the opening 20 to the atmosphere. Any variation of cabin pressure causes an immediate corrective movement of the diaphragm 38 and the directly connected outflow valve 40. The sequence of operation by which this is accomplished is next outlined.

Under high ambient atmospheric pressure conditions, as when the airplane is on the ground near sea level, pressure in the chamber 56 tends to compress the evacuated isobaric bellows 60 against the force of the tension spring 65. The isobaric needle valve 61 moves in response to this bellows movement and is in the open position when the bellows is compressed. During pressurized flight, supercharged air in the cabin 10 enters the chamber 56 through the restricted orifice 64 and is allowed to flow out to the atmosphere through the opening 62 of the needle valve 61 to maintain regulating chamber pressure at a constant value somewhat less than cabin pressure. As pressure builds up in the cabin, the pressure differential between the cabin and the regulating chamber increases. This differential moves the diaphragm 38 upwardly, unseating the outflow valve 40 and allowing cabin air to flow to atmosphere through the opening 20. Thus, air is circulated through the cabin but constant pressure is maintained therewithin.

Referring to Fig. 3 of the drawings, the control pressure within the chamber 25 acts against the top of the diaphragm assembly 38, 44 within an annular area, the width of which is designated by the dimension line A. Since the inner portion of the convolution 48 and the outer portion of the convolution 49 are fixed, only those portions of the convolutions which are adjacent each other need be considered in determining the effective pressure area of the diaphragm assembly, hence the line A extends from the midpoint of the arcuate convolution 48 to the midpoint of the arcuate convolution 49. In determining the total area of the bottom of the diaphragm assembly contacted by the cabin air pressure, this air pressure is considered to act against the lowermost surfaces of the convolution 49, clamping annulus 44, and valve element 41, including the projected areas of the periphery of the frusto-conical portion 42 and the outer tapered portion of the sharpened edge 43. Since the edge 43 is in vertical alignment with the midpoint of the convolution 48, the bottom area contacted by the cabin air pressure is also represented by the dimension line A. In other words, the areas contacted by the control air pressure and the cabin air pressure are equal. By this provision, the valve member 40 is balanced at any position when the control air pressure plus the spring force is equal to the cabin air pressure. Due to the frusto-conical shape of the extension 42 of the valve member 40, forces on the valve member caused by differences in pressures in the cabin and the ambient atmosphere are exerted equally and oppositely and thus do not disturb the setting of the valve.

When flying in the unpressurized range, as the airplane ascends and atmospheric pressure decreases, the pressure within the chamber 56 also tends to diminish by reason of the open needle valve 61—62 which vents to atmosphere through the tube 63. The isobaric bellows 60, which is compressed at sea level, expands as a result of the decrease in regulating chamber pressure and moves the needle valve 61 to restrict the exit of air from the chamber as the airplane climbs. When the isobaric or constant cabin pressure range is reached, this action of the bellows 60 prevents further decrease in pressure within the regulating and control chambers 56 and 25 and maintains the same at a selected constant pressure throughout the isobaric range. With control chamber pressure established at a constant value, any decrease in cabin pressure causes the diaphragm 38 and outflow valve member 40 to move downwardly to restrict the outflow of cabin air until the cabin pressure has returned to its selected value. Thus, for any given setting of the isobaric spring 65, the isobaric control system maintains cabin pressure at a constant value within the limits of the isobaric range of operation.

This discussion has been concerned, up to this point, with operation of the basic regulator 26 at one setting of the isobaric bellows system. The regulator may be adjusted by means of the isobaric changer unit, referred to previously but not shown herein, to regulate the cabin pressure to any value within the isobaric range; and to change the cabin pressure from one value to another at a predetermined rate. When the changer is actuated to adjust the tension spring 65, the pressure sensing action of the isobaric bellows is changed. This causes the regulating and control chambers to assume a new control pressure, which in turn adjusts the cabin pressure to the selected value for the new altitude. The rate at which the tension spring 65 is adjusted by the isobaric changer determines the rate at which cabin pressure is adjusted from one value to another.

As the airplane ascends, the pressure differential between the cabin and atmosphere becomes greater. When the pressure differential reaches a maximum value, for example 4.06 p. s. i., the isobaric bellows 60 is fully expanded, and the isobaric needle valve 61—62 is thus closed. At this point, pressurization control is taken over by the differential control system 58. As previously pointed out, the interior of the differential bellows 70 is vented to atmosphere through the tube 63. At the maximum limit of the isobaric range of operation, the pressure differential between the chamber 56 and the interior of the differential bellows 70 is sufficient to contract the bellows and begin opening the directly connected differential needle valve 71. Since this needle valve is vented to atmosphere, the regulating (and control) chamber pressure will be decreased to the value determined by the setting of the differential tension spring 73. Cabin pressure then acts against the diaphragm 38 and opens the outflow valve 40 the amount required to balance the pressure differential across the diaphragm. This action of the differential control continues throughout the differential range to regulate cabin pressure to a constant value, for example the 4.06 p. s. i. value, above atmospheric pressure.

It will be apparent from the foregoing that the present improved pneumatic valve is extremely simple in construction and highly efficient in operation. Since the areas at the opposite sides of the diaphragm assembly which are subjected to different air pressures are equal, it follows that the movable valve member attains perfect balance or stability at any setting when these pressures become equal in value. Thus, the valve member remains at rest until a pressure differential exists between the control chamber 25 and the cabin 10. The outer area of the diaphragm 38 which is exposed to the atmosphere is of sufficient area to provide a force on the movable valve, due to the action of atmospheric pressure, equal and opposite to the force which is due to atmospheric pressure action against the inner area of the movable valve. This outer area of the diaphragm is spaced at a considerable distance from the point at which the air exhausts from the cabin and consequently the effect of turbulence upon the diaphragm is negligible and the adjustment or setting of the valve member 48, as determined by the isobaric or differential systems, remains unchanged. The present valve thus operates with greater accuracy than other outflow valves heretofore employed for like purposes. Of particular note in the construction shown is the very small included or cone angle of the frusto-conical portion 42, by reason of which the component of the dynamic force of the outflow air in a valve opening direction is substantially a small constant. That is, changes of flow conditions reflecting changes of the dynamic head on the valve would result in insignificant changes in the component of force exerted on it in the opening direction, since such change of component force would be a trigonometric sine function, one-half of the small included angle.

Figure 4:
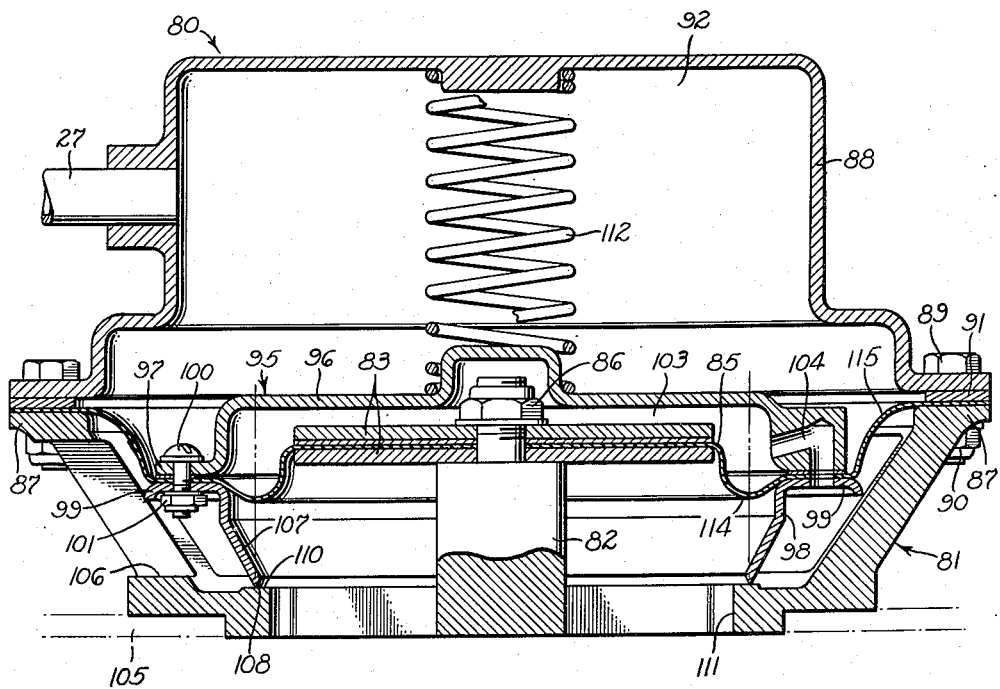
Fig. 4 is a view similar to Fig. 3, showing a modified version of the valve.

Referring now to Fig. 4 of the drawings, it is also within the concept of the present invention to construct a pneumatic outflow valve 80 of the modified construction shown therein. In this alternative structure, a valve body 81, of substantially the same type as the valve body 15, is employed. A post 82 supported by and extending coaxially within the valve body 81, carries a pair of clamping discs 83 at its upper end. The clamping discs 83 receive between them the central portion of a diaphragm 85, a nut 86 screwed onto the upper projecting end of the post 82 serving to force the discs together so as to clamp the diaphragm therebetween. The peripheral portion of the diaphragm 85 is clamped between the upper flanged portion 87 of the valve body 81 and the lower flanged portion of a cup-shaped control casing 88, by means of bolts 89 and nuts 90, a sealing ring 91 being also interposed between the flanges to provide an airtight connection. The interior of the casing 88 is hereinafter referred to as the control pressure chamber 92, this chamber being vented to the regulating chamber 56 through the tube 27.

A movable valve assembly 95 includes a clamping shell 96 which overlies the discs 83 and which has an annular flange 97 which is disposed against the upper surface of the diaphragm 85. An annular valve member 98 has a peripheral flange 99 at its upper end, this flange engaging the lower surface of the diaphragm 85 directly beneath the flange 97 of the shell 96. Screws 100 pass through aligned holes in the flanges 97 and 99 and the diaphragm 85, and nuts 101 screwed onto the screws clamp the parts together so that the shell 96 and valve member 98 are connected for unitary axial movement in response to flexing of the diaphragm 85 in either direction.

By this construction, an auxiliary pressure chamber 103 is defined by the walls of the shell 96, the upper disc 83 and the diaphragm 85. As in the first form of my invention, the parts 83 comprises a wall or barrier which with the flexible connecting means comprising a convolution 114 cooperates with the frusto-conical part or flange of the valve to form a pocket accessible to external fluid pressures through the valve opening. In this form of my invention, however, there is provided the auxiliary chamber 103 so that in effect the pressure responsive means extends entirely across the pressure chamber and has chamber pressure on one side and cabin pressure on the opposite side. A passage 104 formed by holes in the flange 99, the diaphragm 85 and the flange 97 communicates between the chamber 103 and the interior of the cabin or enclosure 105 through the openings 106.

The lower frusto-conical end portion 107 of the valve member 98 has its lower extremity cut at an angle to provide, in effect, a sharpened valving edge 108 which, when the valve assembly 95 is moved downwardly, engages a flat annular seat 110 to prevent the outward flow of cabin air through the central opening 111 of the valve body 81 to the atmosphere. A relatively weak spring 112 lightly compressed between the shell 96 and the upper wall of the casing 88 tends to move the valve assembly to closed position.

As shown in Fig. 4, the diaphragm 85 has a curved convolution 114 extending between the discs 83 and the valve member 98 and another curved convolution 115 extending between the valve member and the flange 87 of the valve body 81. The pressure of air within the control pressure chamber 92 is applied directly against the entire area of the upper surface of the shell 96 and against the convolution 115 of the diaphragm 85 and this pressure is augmented by the force applied by the spring 112. Cabin pressure is applied against the under surface of the convolution 115 of the diaphragm 85, the under surface of the flange 99 of the valve member 98 and the vertically projected area of the tapered lower portion 107 of the valve member. This latter pressure is also applied against the under surface of the shell 96, by reason of the passage 104, through which the cabin air enters the auxiliary pressure chamber 103. It is thus seen that the control air pressure and the cabin air pressure are applied to equal effective areas of the respective top and bottom of the valve assembly 95 in all positions of the assembly so that in any flow condition the valve assembly is perfectly balanced when the cabin air pressure is equal to the control air pressure plus the force of the spring 112.

The modified valve structure illustrated in Fig. 4 operates in the same manner as the pneumatic valve shown in Figs. 1 to 3 and like advantages are obtained through the use of either valve. While the control and cabin pressures are applied against limited annular areas of the opposite sides of the valve assembly shown in Figs. 1 to 3, these pressures are applied against complete circular areas in the alternative valve assembly illustrated in Fig. 4. Thus, for operating in the same range of pressures, the modified valve assembly can be made considerably smaller in diameter since the differential pressures act over much greater areas.

I claim as my invention:

1. A fluid valve for use in an air pressurizing system in which air is introduced into an enclosure to pressurize the same, comprising: a valve body having an opening therein and a valve seat surrounding said opening; and a valve assembly extending across said valve body and providing at one side a chamber adapted to contain control air under pressure, the other side of the valve assembly being exposed to air external of said chamber, said valve assembly including an air impervious flexible element having its central and peripheral portions fixed and also including a valve member carried by said flexible element and provided with a frusto-conical extension engageable with said seat, said flexible element being adapted to flex in response to differentials in pressure applied against its opposite sides so as to move said valve member toward and away from said seat to regulate the flow of air through said valve body opening, the areas of said valve assembly exposed to said control air pressure and opposing said control air pressure being equal so that said valve assembly is substantially balanced.

2. A fluid valve as defined in claim 1 and including a spring within said chamber and engageable with said valve assembly to augment the force applied against said valve assembly by said control air pressure.

3. A fluid valve as defined in claim 1 and including wide support means for fixedly supporting the central portion of said flexible element so that the flexible area of said element exposed to said pressures is small and annular.

4. A fluid valve as defined in claim 1 and including wide support means for fixedly supporting the central portion of said flexible element so that the flexible area of said element exposed to said pressures is small and annular, said valve member having an annular flange secured to said annular flexible area.

5. A fluid valve as defined in claim 1 and including wide support means for fixedly supporting the central portion of said flexible element so that the flexible area of said element exposed to said pressures is small and annular, said valve member having an annular flange secured to said annular flexible area, said valve also including a clamping element disposed against said annular flexible area within said chamber in alignment with said annular flange, and fastening means for securing said flange and said clamping element to said annular area, the total area of said flexible element and said clamping element exposed to said control air pressure being equal to the total area of said flexible element and said valve member opposed to said control air pressure.

6. A fluid valve as defined in claim 1 in which said flexible element is provided with an annular convolution of arcuate cross section between said central portion and the point of connection of said valve member, the diameter of the mid-portion of said annular convolution being equal to the diameter of the seat-engaging end of said valve member.

7. A fluid valve for controlling the pressure in an enclosure having a flow passage to the exterior, comprising: a valve body having a valve opening and having means whereby it may be installed for communication through the flow passage, said valve body having a seat surrounding said opening; a casing attached to said valve body and having a connection to a source of control air pressure; wall means adjacent said valve opening, flexible means secured between said wall means and said casing and cooperating therewith to define a control pressure chamber, said flexible means being adapted to flex in opposite directions in response to differentials in pressure on opposite sides thereof; and a frusto-conical valve member having a free edge cooperable with said seat, said valve member being adjacent said wall means and operatively connected to said flexible means and movable toward and away from said seat to diminish or increase the flow through said opening, said wall means being supported independently of said valve member and being restrained in movement to prevent application of force therefrom through said flexible means to said valve member, the total effective areas of said flexible means and said valve member exposed to the pressures in said control pressure chamber and to the pressure externally of said control pressure chamber being substantially equal.

8. A fluid valve comprising: a pressure chamber; a valve seat; a pressure responsive element including a valve projecting therefrom toward said seat, one side of said pressure responsive element being exposed to the interior of said pressure chamber, a fixed member supported centrally of said valve; and flexible sealing means connecting said central member and said pressure responsive element.

9. A fluid valve comprising: a pressure chamber; a valve seat; an annular pressure responsive element including a valve projecting therefrom toward said seat; one side of said pressure responsive element being exposed to the interior of said pressure chamber; a member supported within said valve and positioned between said valve seat and said pressure chamber; and flexible sealing means connecting said member and said pressure responsive element.

10. A fluid valve comprising: a pressure chamber; a valve seat; a pressure responsive means having an area subjected to the pressure in said pressure chamber and having a portion comprising a valve operatively connected to said pressure responsive means and projecting toward said seat, said pressure responsive means having an annular area outwardly of said valve; barrier means within said valve and between said pressure responsive means and said valve seat, said barrier means cooperating with said pressure responsive means to form a chamber on the side of said pressure responsive means opposite said pressure chamber.

11. A fluid valve comprising: walls defining a pressure chamber having an annular opening; a valve seat; an annular pressure responsive means subjected on one side to chamber pressure through said annular opening and having sealing engagement with said walls forming said annular opening; and an annular valve of smaller external diameter than said annular pressure responsive means projecting from said annular pressure responsive means toward said seat, said valve having a free annular edge engageable with said seat.

12. In a single poppet balanced valve: a valve seat; a central member supported in spaced relation to said seat; a valve member movable toward and from said seat relative to said central member and cooperating with said central member to form a pocket adjacent to said seat; flexible means forming a seal between said central member and said valve member, said flexible means having an area exposed to the pressure of any fluid in said pocket; and said valve member having an area exposed to the pressure of any fluid in said pocket and being in opposed relationship to the said area of said flexible means.

13. In a flow control mechanism for an enclosure having an opening and a valve seat thereabout: a movable valve member comprising a wall from which a flange extends toward said valve seat, the free end of said flange being adapted to engage the seat about said opening; wall means cooperating with said flange to form a pocket exposed to the exterior of said enclosure through said opening thereof, said valve member being movable relative to said wall means; and flexible means connecting said wall means and said flange, said flexible means and said flange having opposed surfaces exposed to the pressure in said pocket so that any force exerted thereagainst produces substantially no effective influence in a direction tending to open or close said valve member.

14. In a flow control mechanism for an enclosure having an opening and a valve seat thereabout: a movable valve member comprising a wall from which a flange extends toward said valve seat, the free end of said flange being adapted to engage the seat about said opening; wall means cooperating with said flange to form a pocket exposed to the exterior of said enclosure through said opening thereof, said valve member being movable relative to said wall means; and flexible means connecting said wall means with said flange, said flexible means and said flange having opposed surfaces exposed to the fluid entering said pocket through said opening of said enclosure, the effective areas of said opposed surfaces tending to open and close said valve member being substantially equal to thereby substantially cancel any tendency for the pressure of such fluid to open or close said valve member.

15. A fluid valve comprising: a pressure chamber; a valve seat; a pressure responsive element forming a wall of said pressure chamber; a valve member supported by said pressure responsive element and projecting therefrom toward said seat; a central member supported within said valve and positioned between said valve seat and the central portion of said pressure responsive element; and flexible sealing means connecting said central member and said pressure responsive element.

16. A fluid valve for controlling the pressure in an enclosure having a flow passage to the exterior, comprising: a valve body having a valve opening and having means whereby it may be installed for communication through the flow passage, said valve body having a seat surrounding said opening; a casing attached to said valve body and having a connection to a source of control air pressure; a flexible element secured between said valve body and said casing and cooperating therewith to define a control pressure chamber; support means for rigidly supporting a central portion of said flexible element so that the effective portion of said element is annular, said effective portion of said flexible element being adapted to flex in opposite directions in response to differentials in pressure on opposite sides thereof, and a frusto-conical valve member operatively connected to said annular portion of said flexible element and movable toward and away from said seat to diminish or increase the flow through said opening, the total effective areas of said flexible element and said valve member which are exposed to the pressure in said control pressure chamber and to the pressure externally of said control pressure chamber being substantially equal.

17. A fluid valve for controlling the pressure in an enclosure having a flow passage to the exterior, comprising: a valve body having a valve opening and having means whereby it may be installed for communications through the flow passage; said valve body having a seat surrounding said opening; a casing attached to said valve body and having a connection to a source of control air pressure; a flexible element secured between said valve body and said casing and cooperating therewith to define a control pressure chamber; support means for rigidly supporting a central portion of said flexible element so that the effective portion thereof is annular, said effective portion of said flexible element being adapted to flex in opposite directions in response to differentials in pressure on opposite sides thereof; and an annular frusto-conical valve member operatively connected to said annular portion of said flexible element, said valve member having an annular seat engaging portion surrounding said opening, said valve member being movable toward and away from said seat to diminish or increase the flow through said opening, the total effective areas of said flexible element and said valve member, exposed to the pressures in said control pressure chamber and to the pressure externally of said pressure chamber, being substantially equal.

18. A fluid valve for controlling the pressure in an enclosure having a flow passage to the exterior, comprising: a valve body having a valve opening and having means whereby it may be installed for communication through the flow passage, said valve body having a seat surrounding said opening; a casing attached to said valve body and having a connection to a source of control air pressure; a flexible element secured between said valve body and said casing and cooperating therewith to define a control pressure chamber; support means for rigidly supporting a central portion of said flexible element so that the effective portion thereof is annular; and an annular frusto-conical valve member secured to one side of said annular portion of said flexible element, said valve including a rigid clamping element disposed on the opposite side of said flexible element and engaging said annular portion of said flexible element, said flexible element having convolutions between said support means and said clamping element and between said clamping element and the point of attachment of said flexible element to said valve body, said convoluted portions being adapted to flex in response to differentials of pressure on opposite sides thereof, said valve member being movable toward and away from said seat to diminish or increase the flow through said opening, the total effective areas of said flexible element and said valve member, exposed to the pressures in said control pressure chamber and to the pressure externally of said control pressure chamber, being substantially equal.

19. A fluid valve for controlling the pressure in an enclosure having a flow passage to the exterior, comprising: a valve body having a valve opening and having means whereby it may be installed for communication through the flow passage, said valve body having a seat surrounding said opening; a casing attached to said valve body and having a connection to a source of control air pressure; a flexible element secured between said valve body and said casing and cooperating therewith to define a control pressure chamber; support means for rigidly supporting a central portion of said flexible element so that the effective portion thereof is annular; and an annular frusto-conical valve member secured to one side of said annular portion of said flexible element, said valve also including a rigid clamping element disposed against the opposite side of said annular portion, said valve member being movable toward and away from said seat to diminish or increase flow through said opening, said annular portion of said flexible element having convolutions between said support means and seat clamping element and between said clamping element and the point of attachment of the flexible element with said valve body, said annular portion of said flexible element being adapted to flex in opposite directions in response to differentials of pressure on opposite sides thereto, the annular area of said clamping element and the areas of convolutions of said annular portion between said support means and said clamping element and between said clamping element and the point of attachment of the flexible element with said valve body being exposed to the control air pressure, the area of said last-named part of said annular portion of said flexible element and areas of said valve member being exposed to enclosure air pressure, the total area exposed to control air pressure being equal to the total area exposed to enclosure air pressure.

20. A fluid valve for controlling the pressure in an enclosure having a flow passage to the exterior, comprising: a valve body having a valve opening and having means whereby it may be installed for communication through the flow passage, said valve body having a seat surrounding said opening; a casing attached to said valve body and having a connection to a source of control air pressure; a flexible element secured between said valve body and said casing and cooperating therewith to define a control pressure chamber; a support means for rigidly supporting a central portion of said flexible element so that the effective portion of said flexible element is annular, said effective portion of said flexible element being adapted to flex in opposite directions in respect to differentials in pressure on opposite sides thereof; and a frusto-conical valve member, said valve member being annular and secured to one side of said annular portion of said flexible element, said valve also including a rigid, circular, shell disposed at the opposite side of said flexible element and overlying said support means in spaced relation thereto, said shell having an annular flange secured to said annular portion of said flexible element, said support means and said flexible element and said shell defining between them an auxiliary pressure chamber, said valve member and said flexible element and said shell being provided with a common passage communicating between the interior of the enclosure and said auxiliary pressure chamber so that control air pressure applied against one side of said shell is counteracted by enclosure air pressure applied against the opposite side of said shell, the total area of said shell and said flexible element exposed to control air pressure being equal to the total area of said flexible element, said shell and said valve member exposed to said enclosure air pressure, said valve member being movable toward and away from said seat to diminish or increase the flow through said opening, the total effective areas of said flexible element and said valve member, exposed to the pressures in said control pressure chamber and to the pressure externally of said control pressure chamber, being substantially equal.

21. A fluid valve comprising: a pressure chamber; a valve seat; a pressure responsive element including a valve projecting therefrom toward said seat, one side of said pressure responsive element being exposed to the interior of said pressure chamber; a member supported centrally of said valve; and flexible sealing means extending outwardly of said member and connecting same with said pressure responsive element.

22. A fluid valve comprising: a pressure chamber, a valve seat; a pressure responsive element including a valve projecting therefrom toward said seat; one side of said pressure responsive element being exposed to the interior of said pressure chamber; a member supported within said valve and positioned between said valve seat and said pressure chamber; and flexible sealing means connecting said member and said pressure responsive element.

23. In a flow control mechanism for an aircraft cabin: a chamber; a pressure responsive element having an area on one side exposed to chamber pressure and an area on the other side exposed to cabin pressure; a central member; a flexible wall connecting said central member and said pressure responsive element; and a valve projecting from said pressure responsive element, having a wall with an area in opposing relation to said flexible wall.

24. In a flow control mechanism for an aircraft cabin: a chamber; a pressure responsive element having an area on one side exposed to chamber pressure and an area on the other side exposed to cabin pressure; a central member; flexible means connecting said central member and said pressure responsive element; and a valve projecting from said pressure responsive element, said flexible means and said valve having opposed surfaces exposed to the same air outside said chamber, the effective areas of said opposed surfaces, tending to open and close said valve, being substantially equal to thereby substantially cancel any tendency for the pressure of such air to open or close said valve.

25. A fluid valve comprising: a pressure chamber; a valve seat; a pressure responsive element including a valve projecting therefrom toward said seat, one side of said pressure responsive element being exposed to the interior of said pressure chamber; a member supported centrally of said valve; and flexible sealing means extending outwardly of said member and peripherally connected with said pressure responsive element.

26. A fluid valve comprising: a pressure chamber; a valve seat; a pressure responsive element including a valve projecting therefrom toward said seat; one side of said pressure responsive element being exposed to the interior of said pressure chamber; a member fixedly supported within said valve and positioned between said valve seat and said pressure chamber; and flexible sealing means connecting said member and said pressure responsive element.

27. In a pressure control mechanism for controlling the pressure in an enclosure having an opening to the exterior, the combination of: a pressure chamber; pressure responsive means including a movable valve member and a pressure responsive element carrying said valve member, said pressure responsive element having an area exposed to chamber pressure and an opposed area adapted to be exposed to enclosure pressure, said areas being substantially equal; and barrier means having an operable connection with said pressure responsive means so that said pressure responsive means and said connection have opposed areas exposed through the opening in said enclosure to the exterior, said barrier means being supported independently of said valve member and being restrained in movement to prevent application of force therefrom through said operable connection to said pressure responsive means, the last named areas being so formed that the external pressure exerts substantially no effective force in the direction of opening or closing of said valve member.

RICHARD A. FISCHER.

References Cited in the file of this patent

UNITED STATES PATENTS

| Number | Name | Date |
|---|---|---|
| 2,224,394 | Jurs | Dec. 10, 1940 |
| 2,413,027 | Maxson | Dec. 24, 1946 |
| 2,436,183 | Snedecor | Feb. 17, 1948 |
| 2,441,089 | Teague | May 4, 1948 |
| 2,461,415 | Dube | Feb. 8, 1949 |
| 2,463,487 | Widgery et al. | Mar. 1, 1949 |
| 2,463,492 | Arthur | Mar. 1, 1949 |
| 2,485,113 | Roth et al. | Oct. 18, 1949 |
| 2,531,100 | Arthur et al. | Nov. 21, 1950 |
| 2,578,026 | Taylor | Dec. 11, 1951 |
| 2,590,330 | Krueger | Mar. 25, 1952 |